No. 607,467. Patented July 19, 1898.
F. H. RICHARDS.
AUTOMATIC WEIGHING MACHINE.
(Application filed Nov 12, 1897.)
(No Model.) 6 Sheets—Sheet 1.

Fig.1.

Witnesses:
Chas. L. King,
Fred. J. Dole.

Inventor:
F. H. Richards.

No. 607,467. Patented July 19, 1898.
F. H. RICHARDS.
AUTOMATIC WEIGHING MACHINE.
(Application filed Nov 12, 1897.)
(No Model.) 6 Sheets—Sheet 2.

Fig. 2.

Witnesses:
Chas. H. King,
Fred. J. Dole.

Inventor:
F. H. Richards.

No. 607,467. Patented July 19, 1898.
F. H. RICHARDS.
AUTOMATIC WEIGHING MACHINE.
(Application filed Nov 12, 1897.)
(No Model.) 6 Sheets—Sheet 4.

Fig. 4.

Witnesses:
Chas. D. King,
Fred. J. Dole.

Inventor:
F. H. Richards.

No. 607,467. Patented July 19, 1898.
F. H. RICHARDS.
AUTOMATIC WEIGHING MACHINE.
(Application filed Nov 12, 1897.)
(No Model.) 6 Sheets—Sheet 5.

Fig. 5.

Witnesses:
Chas. D. King
Fred. J. Dole

Inventor:
F. H. Richards

No. 607,467. Patented July 19, 1898.
F. H. RICHARDS.
AUTOMATIC WEIGHING MACHINE.
(Application filed Nov 12, 1897.)
(No Model.) 6 Sheets—Sheet 6.

Fig. 6.

Witnesses:
Chas. D. King,
Fred. J. Dole.

Inventor:
F. H. Richards.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 607,467, dated July 19, 1898.

Application filed November 12, 1897. Serial No. 658,253. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines; and it has for its main object the provision of an improved automatic weighing-machine of the "overloading" type for weighing predetermined quantities of granular or other material.

One of the principal objects of the invention is the employment of a novel form of supply device for the material to be delivered to the load-receiver of the weighing mechanism, this supply device embodying as its essential feature a divided hopper, one or more of the sections of which converge gradually toward the discharge end of the hopper and are reciprocatory relatively to the end sections thereof, two converging oppositely-reciprocatory sections usually being embodied in the hopper. It will be clear that as these converging side sections are reciprocated simultaneously in opposite directions the material at one side of a central plane passing through the spout will be shifted on the descent of one of the side sections in such a manner that it will tend to move transversely toward and beyond such central plane of the hopper, and the material at the opposite side of such central plane on the corresponding rise of the side section against which it lies will tend to move toward the inclined wall of such last-mentioned side section in the same direction substantially as the material at the opposite side of the hopper, the action resulting from these two movements being a positive feeding sidewise and loosening up of the material at one side edge of the discharge end of the supply-hopper and the simultaneous withdrawal of the section at the opposite side of such discharge end from engagement with the flow-stream at such point. Obviously these opposite vertical movements of the converging side sections of the hopper will cause the material in the supply-spout to be pushed positively downward and toward the center from opposite sides of the hopper alternately.

As before stated, the machine illustrated is of the overloading type, in which the load-receiver is carried below the poising-line by the delivery thereinto of an excessive load from which the surplus is removed subsequently by some load-reducing means.

In connection with a machine of this type I have illustrated regulating apparatus of novel construction, which plays an important part in controlling the several operations of the different parts of the weighing mechanism. One feature of this regulating apparatus is the employment of a regulator coöperative with an opening in the load-receiver in such a manner as to receive from said opening part of the completed predetermined load after the making up of the latter and be operated by the portion so received before the main part of the completed charge is delivered from the load-receiver; and a further function of this regulator is the employment of this movement of the latter on the reception of such portion of the completed charge as a means for actuating the shiftable member or load-discharger of the weighing-machine preferably to uncover the said opening in the load-receiver in the usual manner and permit the larger portion or remainder of the completed load to pass out through such opening. The discharge of the main portion of a completed load by the release of a load-discharger or closer operated by a regulator after the latter has been shifted to its regulating position by a portion of the completed charge in the load-receiver is an entirely new departure in this art so far as I am aware, and it constitutes one of the most important features of my present improvements. It will be clear from the description of the operation of this main regulator that I employ, in connection with an overloading weighing-machine having a load-reducing opening in its receiver, a regulator controlled as to one of its movements by material received from such opening and governing in turn the operation of other members of the machine; but as it is necessary in a machine of this type to divert surplus material in excess of the true load into a suitable receiver, so that this material will not be discharged from the main outlet as a part of the completed weighed load, I prefer to employ in connection with this load-reducing opening two regulators, one of which has just been described and the other of which is in the nature of an auxiliary or surplus-receiving regulator controlled by such surplus or excess material flowing from the opening in the receiver. Hence it will be clear that in connection with an overloading weighing-machine having a drip-outlet or load-reducing opening in one wall of its load-receiver I employ two regulators preferably separately operative and governing the movements of different parts of the weighing-machine. In this case the opening movement of the closer or load-discharger is controlled by the main regulator, while it is intended that the auxiliary or surplus-receiving regulator shall prevent the premature descent of the load-receiver for the making up of a new load after the discharge of a completed load therefrom.

It will be obvious, therefore, that still another feature of this invention, and one which pertains particularly to the regulating apparatus, is the employment of a blocking device or detent controlled by a regulator governed in its action by material received from a load-reducing opening in the load-receiver, this blocking device being usually supported on the framework of the machine and operative in this case with the beam mechanism to lock the latter and prevent premature movement thereof in a determined direction.

In the overloading-machine illustrated herein the load-reducing opening in the load-receiver will preferably be one capable of continuously discharging material therefrom so long as the charge in the bucket is at a sufficient height, and in connection with this continuously-discharging opening I may make use of a stream-deflector for diverting the flow of the stream from one to another of a plurality of receivers—in this case from one to the other of the two regulator-hoppers the operation of which I have just described. The movement of this stream-deflector in one direction will be controlled, preferably, by the load-discharger or closer, and said deflector may be counterweighted for movement in an opposite direction.

Other features of the invention relate to the details of construction of the load reducing and controlling devices, to auxiliary devices for controlling the discharge-opening in the main regulator-hopper, and to certain other elements, which will be described more particularly hereinafter.

In the drawings accompanying and forming part of this specification.

Similar characters designate like parts in all the figures of the drawings.

Any suitable framework may be employed for supporting the several parts of my improved weighing-machine. That shown herein embodies as its essential features a main supporting-base, such as 3, preferably chambered and having two spouts, one constituting a main discharge-spout for the weighed loads and being indicated herein by 3', while the other is in the nature of a discharge-spout for the surplus or excess material from the overload and is indicated by 3''.

From the main base 3 may rise substantially A-shaped frames, such as 4 and 4', connected at their upper ends by the usual top plate or cross-beam 5, which will carry stream-supplying means for delivering material to the load-receiver of the weighing mechanism. This stream-supplying means constitutes one of the important features of this invention, as has been stated hereinbefore, and it embodies in this instance two hoppers or supply-spouts, which are indicated by H and H'. The upper hopper or spout H may be a fixed one secured to the top beam 5 and of any suitable construction. That indicated at H' and in which this feature of my present invention is embodied may also be of any suitable type, so long as it is longitudinally divided and one or more of its sections are movable relatively to another or other sections.

In the construction illustrated the supply-hopper H' has four longitudinal hopper-sections, two of which are end sections 10 and 10', while the other two are side sections and are indicated by 12 and 12'. The end sections are preferably parallel with each other and pivotally supported by bearings in hangers or brackets, such as 13, depending from the beam 5, the points of support of the end sections of the hopper being substantially in the central longitudinal or vertical plane of the latter. The side sections 12 and 12' are intended to move longitudinally of the hopper in substantial parallel planes, and for the purpose of guiding them in their movements these sections are preferably carried by suitable guides on the end sections 10 and 10'. This connection is made in the present instance by means of slotted ears or guide members, such as 14, on the side sections 12 and 12', the slots therein receiving corresponding guide pins or screws, such as 15, projecting from the end sections 10 and 10'. Of course the adjacent edges of all the sections should overlap to such an extent as to prevent discharge of material at the sides of the hopper H'.

As it is intended that the end sections of the hopper shall remain substantially fixed while the side sections thereof are reciprocated, of course the latter, while carried on or guided by the end sections, will not be suspended from the hangers 13. Instead the end sections 10 and 10' are trunnioned in the bearings of the hangers 13, and on the trunnions of these end sections I purpose to mount loosely for oscillation thereon a rock-frame, by which the said sections 12 and 12' may be carried. Such a rock-frame is indicated herein by 16, and the operation thereof will be obvious. It may be constructed in any suitable manner, and preferably will be in the form of a substantially rectangular frame, from opposite sides of the center of movement of which the two side sections 12 and 12' of the hopper will be suspended.

In the construction illustrated the hopper-sections 12 and 12' have a pin-and-slot connection, such as indicated by 17, with said frame, the slots being substantially horizontally disposed and of sufficient length to permit freedom of action when the rock-frame is oscillated. The hopper-sections 12 and 12' may be operated by the rock-frame in any desired manner, either continuously or intermittently, and in the construction illustrated I have shown a strap 18, pivotally connected with the forward end of the rock-frame and having its eye surrounding and carried by an eccentric 19 on a driving-shaft 20, which may be rotated in the usual manner by means of a band-wheel 21 and a belt 22, although this particular form of actuating mechanism is not essential.

It will be noticed that as the strap-rod is operated the rock-frame will be oscillated and the side sections 12 and 12' will be reciprocated simultaneously in opposite directions vertically and in parallel planes. As the side walls of these sections 12 and 12' converge toward the discharge end of the hopper, it will of course be obvious that the material in this hopper will be fed downward and will be forced back and forth alternately, transversely of the spout, in accordance with the movements of these sections, it being seen that in this manner a very thorough agitation and positive feed of the material will be effected.

In order to prevent undue swinging movement of the lower end of the hopper H', I may connect any suitable point thereof to some fixed point of the framework, the connection being effected, preferably, by means of a link 23, pivoted on a bracket 24, projecting from the framework, the opposite end of the link being connected in this instance to the forward side section 12 of the hopper.

For the purpose of controlling and cutting off the flow of material delivered to the load-receiver I make use of any suitable stream-controlling means or valve mechanism, this means being shown herein as a single main valve having a curved stream-supporting plate and oscillatory about an axis passing through the flow-stream in the usual manner. This valve may close by its own weight and will be operated by means of the usual thrust-rod, such as 515, and a valve-opening actuator or counterweighted lever 500, the latter of which may be supported with its pivot in alinement with the point of support of the beam mechanism of the machine. The operation of the valve-actuating devices will be obvious. It will be clear also that as the hopper-sections 12 and 12' reciprocate in a vertical direction their path of movement will be substantially transverse to that of the valve-pan, and therefore when the valve is closing and before the stream is entirely shut off the dipping movement of the sections 12 and 12' into and out from the mass supported on the valve 72 will operate to positively feed into the load-receiver the material carried by said valve, and thus assure the making up of a load in the receiver sufficient to carry the latter down below the poising-line.

The load-receiver and beam mechanism employed may be of any suitable type; but I prefer to make use of a bucket, such as G, pivotally supported at two points near its upper and lower ends and substantially in the central vertical plane thereof on a pair of beam mechanisms, such as those indicated herein by B and B'. These beam mechanisms may be carried, substantially in the usual manner, by knife-edge bearings on the framework, and similar knife-edge pivots may be employed for supporting the bucket on the poising-arms of said beams. The two beam mechanisms may be limited in their movements in one direction by the usual stops, such as 30 and 30'.

The load-receiver which I have illustrated is substantially similar to those shown in prior patents granted to me, but at the lower end thereof may be divided, as indicated herein, so as to provide a space, such as 31, passing entirely through the bucket from end to end thereof, in which space two closers may work in such a manner as to control the covering and uncovering of a common outlet for the charge. The load-receiver of course embodies a suitable member shiftable for discharging a completed load, and in this instance I have illustrated two such shiftable members or load-dischargers in the form of closers, such as L and L', preferably oscillatory about axes 35 and 35' and disposed so as to face toward each other. One of the principal features of this closer mechanism is the direct connection of these closers L and L' in such a manner that they will move in unison both when opening and when closing, and I prefer to effect this simultaneous movement of the closers by gearing the oscillatory load-dischargers together, the connection being formed in the present instance by means of gear-segments, such as 26 and 26', fixed on the closers. It should be understood that these gear-segments are provided at different points in the length of the closers and preferably near the ends of the latter, so that the two closers will be maintained in an exact relation with respect to each other at all points in their opening and closing movements. It will be noticed that these two closers are intended to shut by gravity, and they are so connected with the regulator employed, as will be hereinafter more particularly set forth, for opening them that they will not only close by reason of their own weight as soon as all of the material passes out of the regulator, but will also effect the return of said main regulator to its normal or non-regulating position.

For the purpose of connecting the closers with this main regulator, which latter is indicated in a general way by R, I may make use of a rock-arm 37, carried for movement in unison with the closer L' and forming one member of an angle-lever, the other arm of which is indicated by 37', the arm 37 being connected in this case by means of a link or rod 38 with the main regulator R. It will be noticed that no direct connection of the closer L to the regulator is necessary, as the two closers move in unison.

The regulator R is not directly counterweighted, but it is preferably supported for oscillation about an axis 40, passing through the base 3 and at the side of the regulator opposite that at which the link 38 is connected thereto. Its counterweight or actuating-weight forms a part of the closer mechanism, as just stated.

At the lower end thereof the main regulator R, which is preferably in the form of a hopper, may have one or more openings or discharge-spouts, such as 41 and 41', the openings in which are of relatively large diameter, and each of these openings, if there is more than one, may be controlled by means of a suitable valve preferably supported for oscillation on said hopper.

Figure 3:
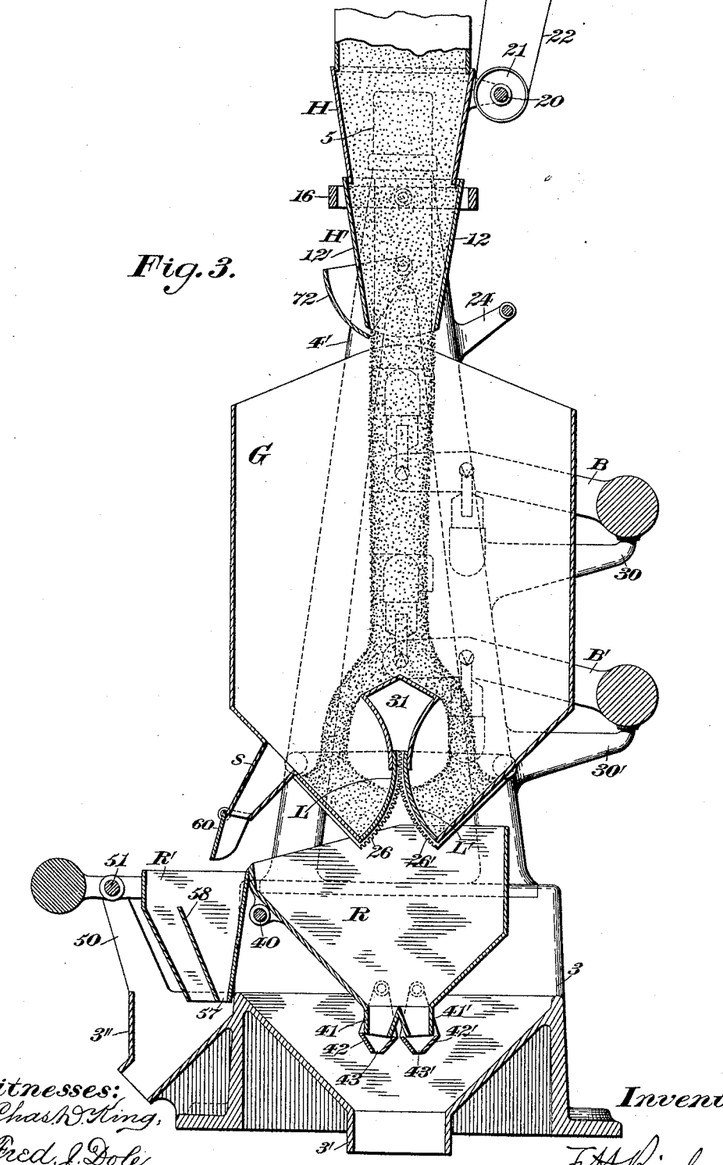
Fig. 3 is a central vertical transverse section of the same, showing the parts in the positions in which they are illustrated in Fig. 2.
Figure 4:
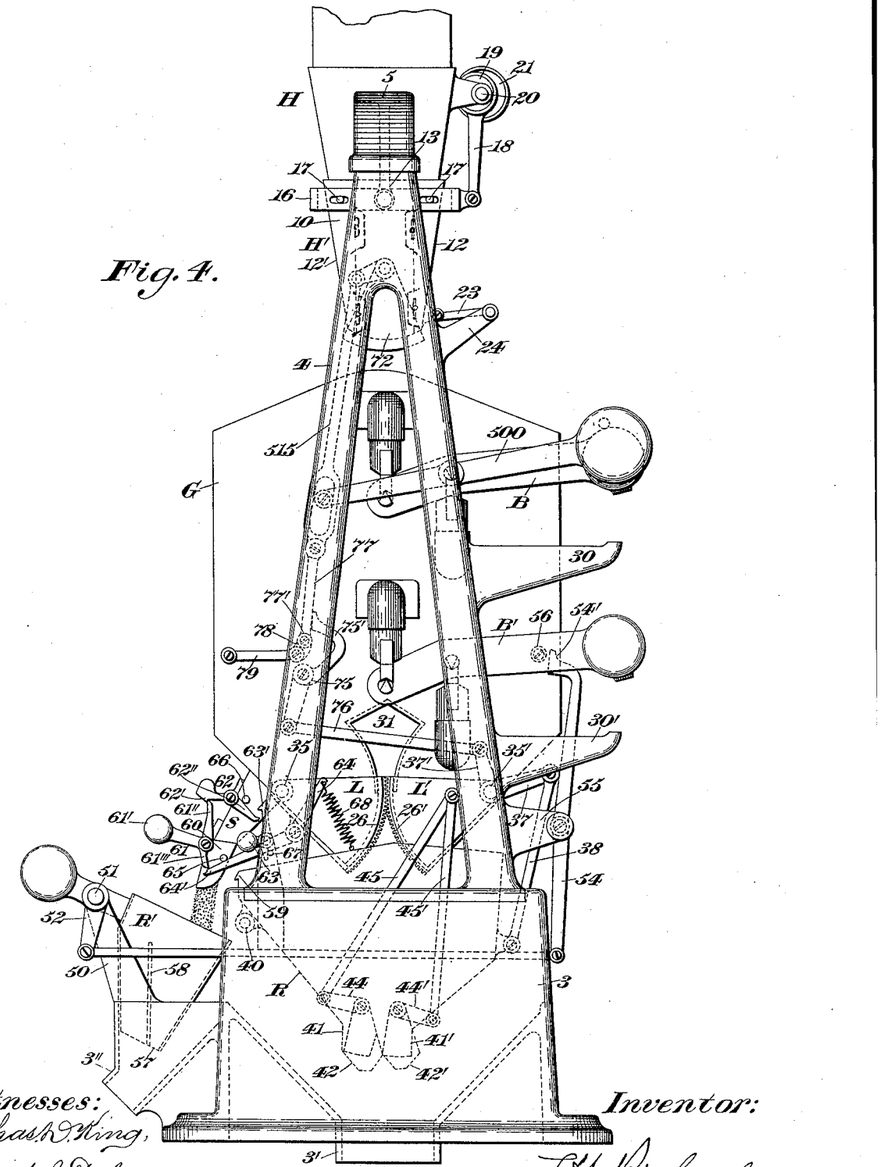
Fig. 4 is a side elevation similar to Fig. 2 and shows the parts in the positions which they assume when the load-receiver is overloaded.

Two valves are shown herein, and they are movable in this instance in opposite directions, one being indicated by 42 and the other by 42'. Each of these valves has a discharge-opening therein, such as 43 or 43', (see Fig. 3,) of relatively small diameter, through which the last portion of the material in the main regulator may pass when these two valves are closed. Each valve has secured thereto in this instance a rock-arm, such as 44 or 44', connected by a suitable rod, such as 45 or 45', with the closer mechanism, preferably at a common point on the closer L', and it will be seen that when the closer is open and the regulator is down the two valves 42 and 42' will uncover the discharge ends of the spouts 41 and 41' and permit material to flow therefrom uninterruptedly.

The other regulator, to which I have referred and which constitutes a surplus-receiver or surplus-receiving regulator, (designated in a general way by R',) is in the form of a hopper preferably counterweighted and supported for oscillation in bearings at the upper end of a pair of brackets 50, rising from the base of the machine, the bearings in these brackets or arms supporting the shaft 51 of the regulator R'.

The shaft 51 may have secured thereto a rock-arm, such as 52, which may be connected by means of a rod 53 with the lower end of a lever 54, preferably pivoted on an arm 55, projecting from the framework, said lever having at its upper end a stop or locking-detent, such as 54', adapted to engage a stop, which may be in the form of an antifriction-roll 56 on the beam mechanism B'.

It will be apparent that the locking member 54' constitutes a blocking device, controlled by the surplus-receiving regulator, for preventing the premature descent of the bucket G after receiving material for a new load.

The load-reducing regulator may be of any suitable type, but will usually have a relatively small discharge end or opening, such as 57, so that the material in said regulator-hopper will not flow out too rapidly. In case an excessive amount of material is delivered into the hopper R' the surplus may be discharged over the edge of a partition 58, which may divide the hopper into two compartments, one of which is intended to be filled at each operation of the machine, while the other will permit the escape of the overflow. The movement of the hopper R' to its normal idle position may be limited by a stop 59 on the main regulator R.

The load-reducing opening in the load-receiver G is preferably at the discharge end of a load-reducing spout, (indicated in a general way by s.) This spout may be at one side and near the lower end of the bucket, and preferably its discharge end will be so positioned as to discharge material into the surplus-receiving regulator R'. As it is intended, however, that part of the completed true load shall be discharged into the main regulator R from this load-reducing spout or opening I have provided a deflector for diverting the stream at the proper point away from the regulator R' and toward the regulator R. This stream-deflector may be of any suitable construction; but in the preferred form thereof, which is shown at 60, I have illustrated an oscillatory chute supported on the spout s and limited by the latter in its movement toward the regulator R, as will be clear by referring to Fig. 3, in which it will be seen that the lower outer end of the spout s constitutes a stop for the chute or deflector 60. This stream-deflector will preferably be counterweighted—as, for example, in the manner shown at 61'—and is intended to be operated to its normal position by the shiftable member or load-discharger of the weighing-machine.

In the construction illustrated there is a train of interdependent by-pass stops between one of the load-dischargers or closers and the load-reducing spout s, these devices controlling the operation of the deflector. In the construction illustrated this train comprises four by-pass devices or stops, which may be of any suitable construction and are designated herein by 61, 62, 63, and 64, respectively.

The by-pass 61 is carried by and movable with the stream-deflector and has a pair of stop-arms 61'' and 61'''. The movement of the stop-arm 61'' is limited by a stop, such as 65, on the stream-deflector 60. The by-pass stop 62 is also counterweighted and has a detent 62' for engaging the stop-arm 61'', while at its other end it has an arm 62'', which is intended to be engaged by a detent 63' on the by-pass 63, which last is supported on the framework. The movement of the by-pass 62 may be limited by a stop 66 on the spout s and the movement of the by-pass stop 63 by a stop 67 on the framework.

The by-pass 64 is not counterweighted in this instance as are the other by-pass stops, but may be spring-retracted, as shown at 68, and will be supported on one of the load-dischargers—as, for instance, the load-discharger L—preferably at a point at one side of the center of oscillation of such load-discharger. At the rear end thereof the by-pass 64 has an arm 64', at the outer end of which it may be in the form of a detent or holding device for engaging the stop-arm 61''' and actuating the latter to restore the stream-deflector to a position for diverting the surplus from the load-receiver into the surplus-receiver or regulator R'.

It will be noticed that the by-pass or latch 62 will latch the stream-deflector in this position and that the stop 65 will limit the movement of the arm 64; also, that the detent end 63' of the by-pass 63 constitutes a tripper for releasing the latch 62, and hence permitting the stream-deflector to turn toward the main regulator R.

In connection with the closer mechanism and the main regulator R, I may employ a blocking device or stop coöperative with the valve-opening thrust-rod for preventing the operation of the latter until said regulator rises and the closer is shut. This blocking device is in the nature of a hook, such as 75', at one end of a lever 75, preferably pivoted on the framework, the opposite end of this lever being connected in this instance by a rod, such as 76, with the rock-arm 37' on the closer mechanism.

The thrust-rod 515 has an open link or eye at its lower end, with which link the actuator 500 coöperates, and at its extreme lower end may have pivoted thereto a link, such as 77, which may be guided in turn in lateral direction by a link connection 78 79 with the bucket G. The hook 75' may coöperate with an antifriction-roll 77'; and by engaging the latter may prevent the opening of the valve 72 until the closers are shut and the regulator R is in its uppermost position.

Figure 1:
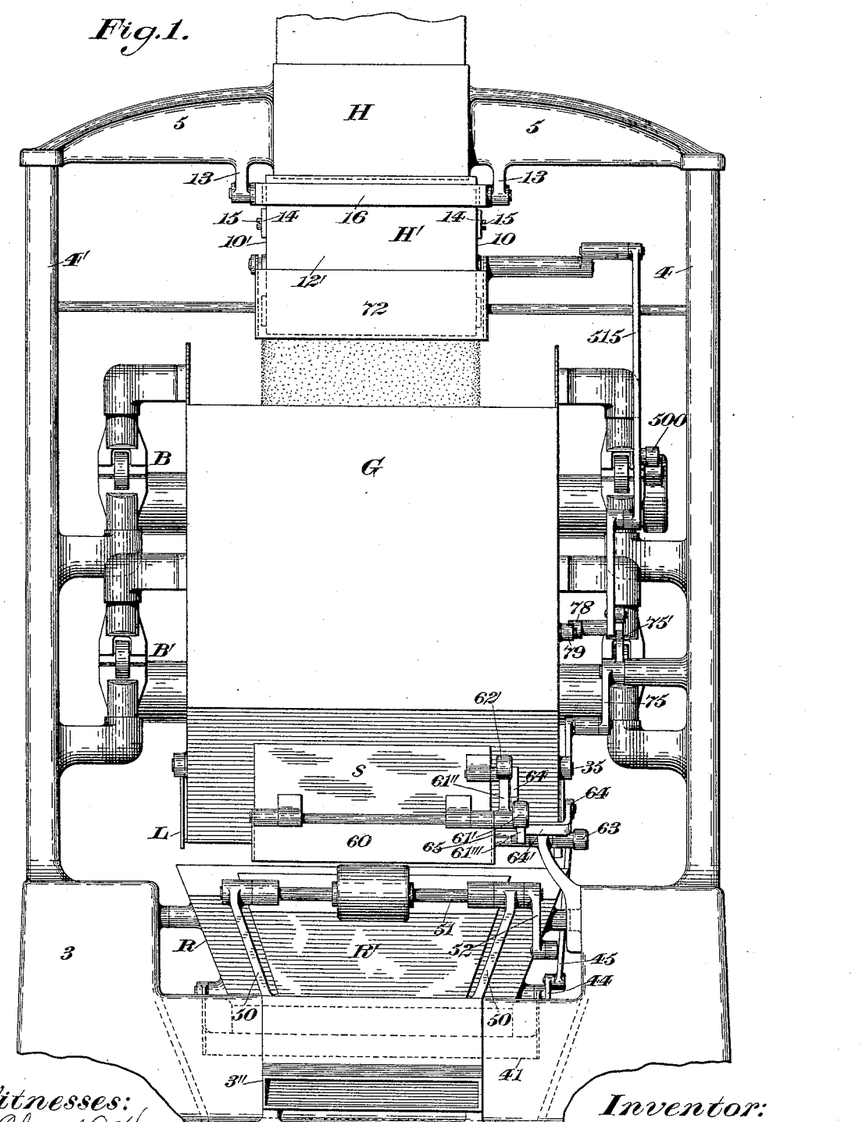
Figure 1 is a rear elevation of a weighing-machine embodying my present improvements, parts of the framework being broken away.
Figure 2:
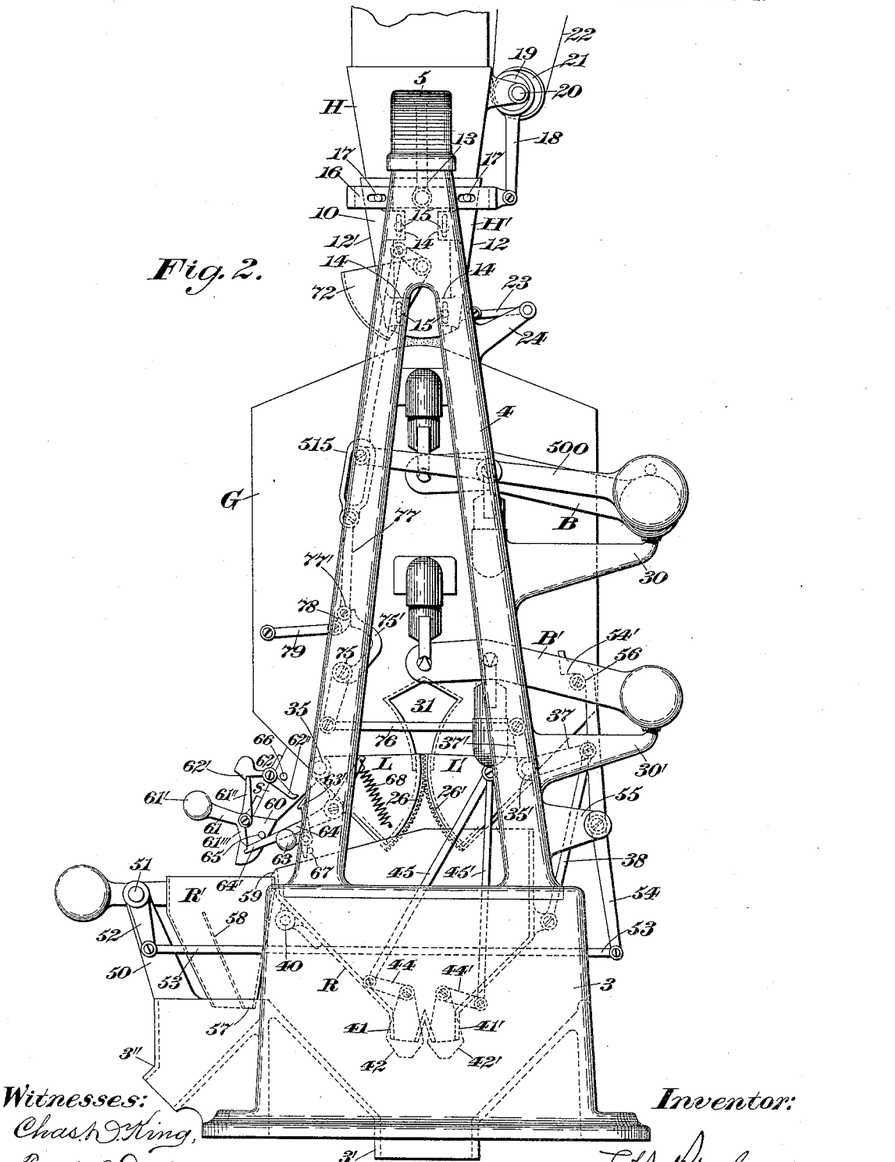
Fig. 2 is a side elevation of the same, looking from the right in Fig. 1, and shows the parts in their normal positions for making up a new load.
Figure 5:
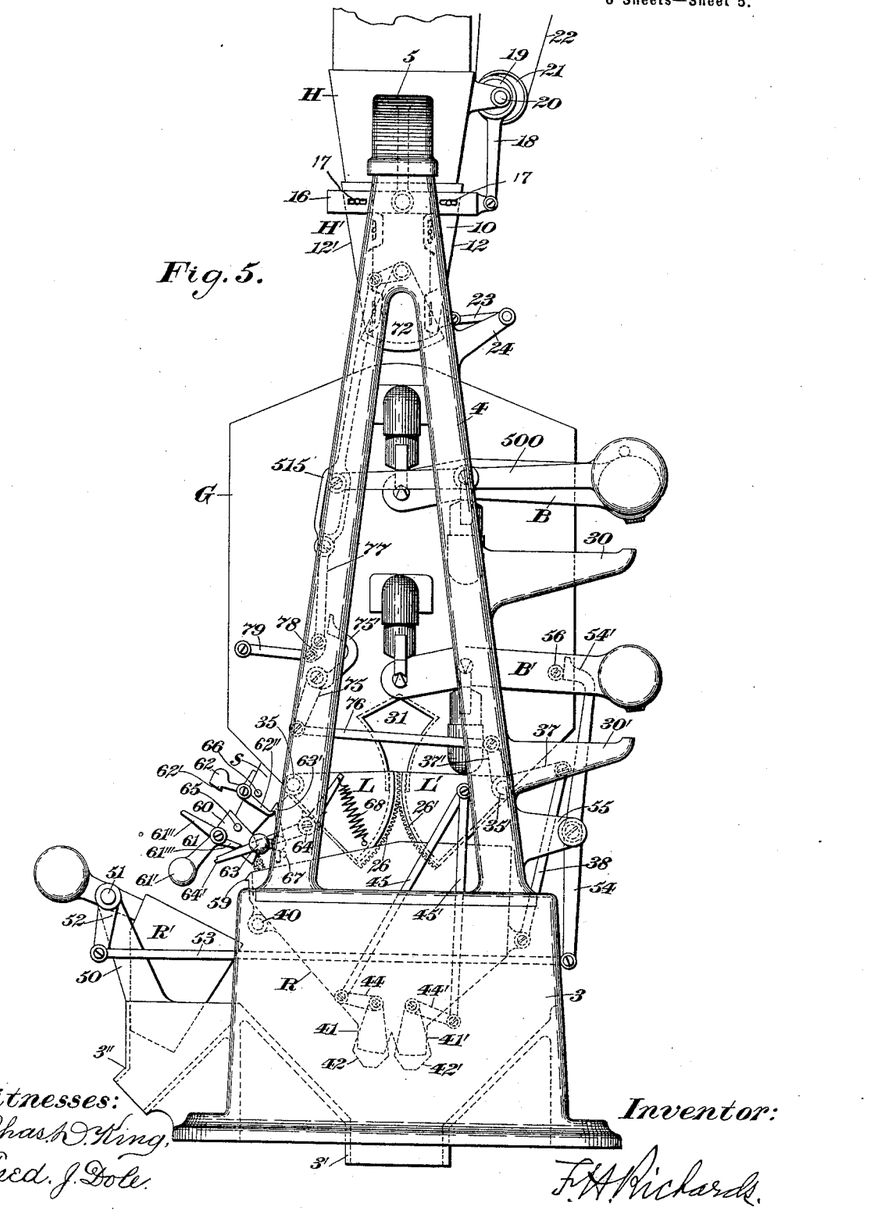
Fig. 5 is a similar view showing the positions of the parts on the rise of the load-receiver and just prior to the opening of the closers.
Figure 6:
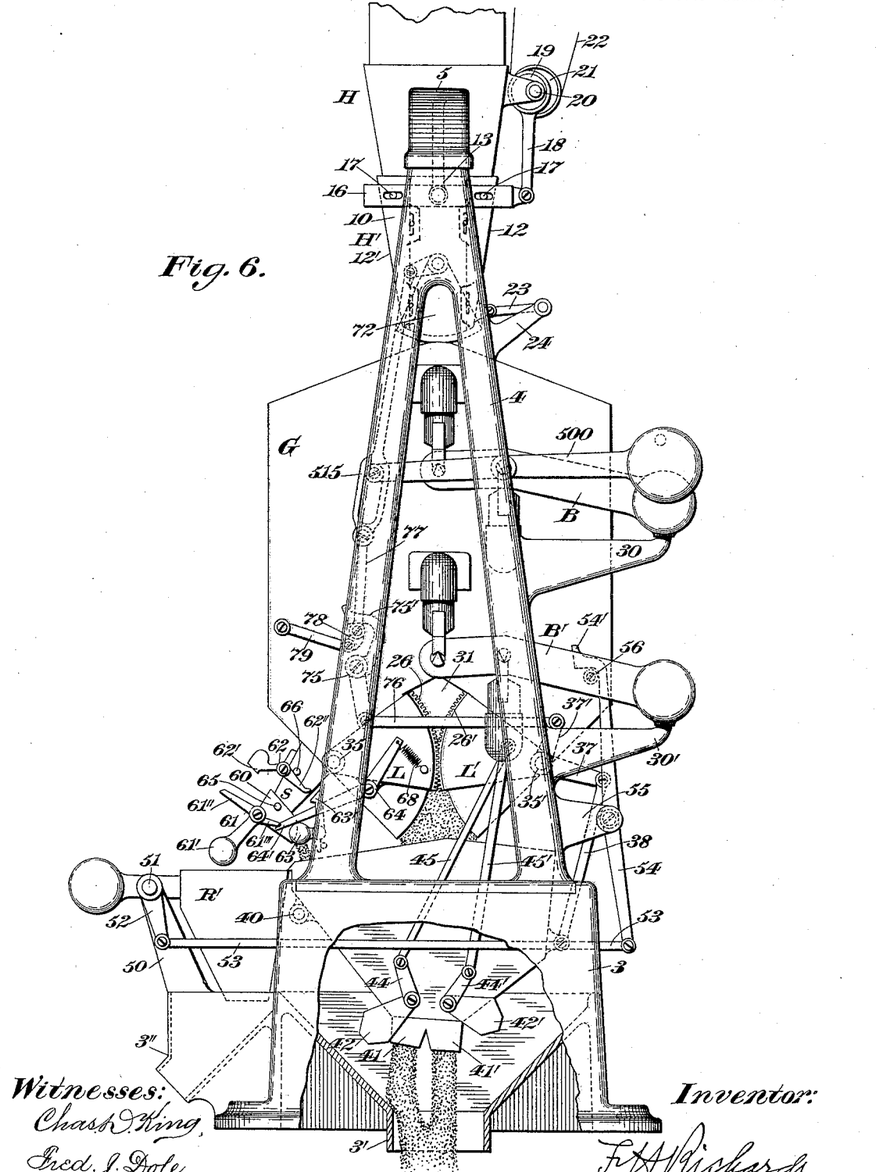
Fig. 6 is a similar view, with parts broken away, illustrating the positions of the parts on the discharge of the main portion of the load into the regulator.

The operation of a machine constructed in accordance with my present improvements, as illustrated in the drawings of this application, is as follows: It being understood that all of the parts are in their normal positions, with the valve 72 opened, the load-discharger shut, the two regulators in their normal uppermost positions, and the stream-deflector in position to permit material from the bucket to flow into the surplus-receiver R', it will be seen that the flow-stream from the hopper will be constantly agitated and constantly fed down the spout H' and that the flow will continue until an overload is in the bucket, when the valve will shut by its own weight on the descent of the load-receiver, and the surplus-receiver R' will also be carried down by the material delivered thereinto. On the descent of the bucket the arm 62'' of the by-pass latch 62 will pass by the tripping-detent 63' of the by-pass device 63 on the framework and will not be released from the arm 61'' of the stream-deflector. As soon as the surplus in the load-receiver has been discharged therefrom and the latter rises to the poising-line the tripping-detent 63' will be struck by the arm 62'' of the latch 62 and will release the latter from the arm 61'' on the stream-deflector, whereupon the counterweight 61' will become effective to shift such deflector to divert the material of the true load away from the surplus-receiving regulator R' and into the main regulator R to be discharged as a part of such completed load. (See Fig. 5.) The bucket will continue to rise slightly until a considerable portion of the completed load has been discharged into the main regulator R through the load-reducing spout and the stream-deflecting chute, and when there is a sufficient amount of material in said regulator-hopper to overbalance the weight of the load-dischargers or closers said regulator will descend and, through its connecting-link 38 and rock-arm 37, will cause the closer L' to open, and with it the closer L. It will be noticed here that not only does this movement serve as a means for effecting the opening of the closer, but the opening movement is also aided by the rising of the bucket. As the regulator R falls the two valves 42 and 42' will be opened, and at the same time the hook or blocking device 75' will be shifted to engage the roll 77' (see Fig. 6) and blocking the opening movement of the valve 72. As soon as all the material in the surplus-receiving regulator R' flows out therefrom the latter will rise and the blocking device 54', controlled thereby, will be shifted into engagement with the stop 56 to block the premature descent of the load-receiver G on the beginning of the making up of a new load. As soon as substantially all of the material in the regulator R has passed out through the openings 41 and 41' the latter will rise and the closer will shut, the valves 42 and 42' closing over the mouths of the discharge-spouts 41 and 41'. Whatever material may be left in the regulator will be discharged slowly through the small openings 43 and 43'. As the closers shut the arm 64 on the closer L will engage the arm 61''' on the stream-deflector 60 and the latter will be shifted from the position shown in Fig. 6 to that shown in Fig. 2, whereupon the latch 62 will become effective to reëngage the arm 61'' and latch the stream-deflector in position to deliver material again into the receiver R'. When the closers are entirely shut, the hook 75' will be withdrawn from the stop 77' and the valve-opening actuator 500 will operate to reopen the valve 72, whereupon all of the parts will be in position for making up a new load.

Having described my invention, I claim—

1. In a weighing-machine, the combination, with a longitudinally-divided supply-hopper embodying parallel end sections and side sections converging gradually at an acute angle, of means for actuating said side sections longitudinally relatively to the end sections.

2. In a weighing-machine, the combination, with a longitudinally-divided supply-hopper embodying parallel end sections and side sections converging gradually at an acute angle, of means for actuating said side sections in parallel planes longitudinally relatively to the end sections.

3. In a weighing-machine, the combination, with stream-supplying means and with stream-controlling means, of a load-receiver having a discharge-opening, and a pair of oscillatory load-dischargers facing toward each other and movable about parallel axes adjacent to opposite sides of said opening and having their working faces concentric with their respective axes of oscillation and geared together for movement in unison.

4. In a weighing-machine, the combination, with stream-supplying means and with stream-controlling means, of a load-receiver having a discharge-opening, and a pair of inwardly-facing oscillatory load-dischargers having their working faces concentric with their respective axes of oscillation and controlling said opening and geared together at different points in the length thereof for movement in unison.

5. In a weighing-machine, the combination, with stream-supplying means and with stream-controlling means, of a load-receiver embodying a member shiftable for discharging a load, and a regulator operative for actuating said shiftable member to discharge the load.

6. In a weighing-machine, the combination, with stream-supplying means and with stream-controlling means, of a load-receiver; a load-discharger; and a load-discharger-actuating regulator operative for operating said load-discharger.

7. In a weighing-machine, the combination, with overloading means and with a load-receiver embodying a member shiftable for discharging a load, said load-receiver also having a load-reducing opening, of a regulator controlled by material discharged from said opening.

8. In a weighing-machine, the combination, with overloading means and with a load-receiver embodying a member shiftable for discharging a load, said load-receiver also having a load-reducing opening, of a regulator controlled by material discharged from said opening and governing the operation of a movable member of the machine.

9. In a weighing-machine, the combination, with overloading means and with a load-receiver embodying a member shiftable for discharging a load, said load-receiver also having a load-reducing opening, of a regulator controlled by material discharged from said opening and operative for actuating the shiftable member of the load-receiver.

10. In a weighing-machine, the combination, with overloading means and with a load-receiver embodying a member shiftable for discharging a load, said load-receiver also having a load-reducing opening, of regulators controlled by material discharged from said opening and governing the movements of different parts of the machine.

11. In a weighing-machine, the combination, with overloading means and with a load-receiver embodying a member shiftable for discharging a load, said load-receiver also having a load-reducing opening, of separately-operative regulators controlled by material discharged from said opening and governing the movements of different parts of the machine.

12. In a weighing-machine, the combination, with overloading means and with a load-receiver embodying a member shiftable for discharging a load and also having a load-reducing opening, of a regulator controlled by material discharged from said opening, and a regulator-operated blocking device coöperative with a movable member of the machine for controlling the operation of the latter.

13. In a weighing-machine, the combination, with overloading means and with weighing mechanism embodying a load-receiver having a member shiftable for discharging a load and also having a load-reducing opening, of a regulator controlled by material discharged from said opening, and a regulator-operated blocking device coöperative with the weighing mechanism for controlling one of the movements of the latter.

14. In a weighing-machine, the combination, with overloading means and with beam mechanism supporting a load-receiver having a member shiftable for discharging a load and also having a load-reducing opening, of a regulator controlled by material discharged from said opening, and a regulator-operated blocking device coöperative with the beam mechanism for controlling one of the movements of the latter.

15. In a weighing-machine, the combination, with overloading means and with a load-receiver embodying a member shiftable for discharging a load and also having a continuously-discharging load-reducing opening, of separate receivers for material discharged from said load-reducing opening, and a stream-deflector shiftable adjacent to said load-reducing opening for deflecting material from the load-reducing opening into any one of the receivers.

16. In a weighing-machine, the combination, with overloading means, of a load-receiver having a continuously-discharging load-reducing opening; a load-discharger; separate load-receiving and surplus-receiving regulators for material discharged from said load-reducing opening; and a stream-deflector for deflecting the material from the load-reducing opening into said regulators alternately.

17. In a weighing-machine, the combination, with overloading means, of a load-receiver having a continuously-discharging load-reducing opening; a load-discharger; separate load-receiving and surplus-receiving regulators for material discharged from said load-reducing opening; and a load-discharger-operated stream-deflector for deflecting the material from the load-reducing opening into said regulators alternately.

18. In a weighing-machine, the combination, with overloading means and with a load-receiver embodying a member shiftable for discharging a load and also having a load-reducing opening, of a surplus-receiving regulator for surplus material discharged from said load-reducing opening, and operative for governing the operation of a movable member of the machine.

19. In a weighing-machine, the combination, with overloading means and with a load-receiver embodying a member shiftable for discharging a load and also having a load-reducing opening, of a counterpoised surplus-receiving regulator for surplus material discharged from said load-reducing opening, and operative for governing the operation of a movable member of the machine.

20. In a weighing-machine, the combination, with two members thereof movable relatively to each other, of a train of interdependent by-pass stops between said members and controlling the movements thereof, two of said stops being carried respectively by said movable members.

21. In a weighing-machine, the combination, with framework, of overloading means; beam mechanism; a load-receiver embodying a member shiftable for discharging a load, and also having a load-reducing opening; a surplus-receiving regulator in position to receive material from said load-reducing opening, and a beam-locking device mounted on the framework and operative by said surplus-receiving regulator.

22. In a weighing-machine, the combination, with framework, of stream-supplying means; a stream-controlling valve; a valve-opening actuator; a valve-opening thrust-rod; a load-receiver; a load-discharger; and a blocking device supported on the framework and operated by the load-discharger, and shiftable into and out of engagement with said thrust-rod.

23. In a weighing-machine, the combination, with framework, of overloading means embodying a stream-controlling valve; a valve-opening actuator; a valve-opening thrust-rod; a load-receiver having a load-reducing opening; a load-discharger; a load-discharger-operating regulator supported to receive material from the load-reducing opening in the load-receiver; and a blocking device supported on the framework and operated by the load-discharger, and shiftable into and out of engagement with said valve-opening thrust-rod.

24. In a weighing-machine, the combination, with stream-supplying means and with stream-controlling means, of weighing mechanism embodying a load-receiver and a load-discharger; a regulator having a relatively large discharge-opening; and a valve controlling the discharge-opening in the regulator and having a relatively small discharge-opening for the last portion of the discharged load.

25. In a weighing-machine, the combination, with stream-supplying means and with stream-controlling means, of weighing mechanism embodying a load-receiver and a load-discharger; a regulator having a relatively large discharge-opening; and a load-discharger-operated valve controlling the discharge-opening in the regulator and having a relatively small discharge-opening for the last portion of the discharged load.

26. In a weighing-machine, the combination, with stream-supplying means and with stream-controlling means, of weighing mechanism embodying a load-receiver and a load-discharger; a regulator having a relatively large discharge-opening; and a load-discharger-operated valve supported on, and controlling the discharge-opening in, the regulator and having a relatively small discharge-opening for the last portion of the discharged load.

FRANCIS H. RICHARDS.

Witnesses:
F. N. CHASE,
FRED. J. DOLE.